United States Patent
Rouyre et al.

(10) Patent No.: US 8,545,958 B2
(45) Date of Patent: Oct. 1, 2013

(54) REINFORCED BLOCK MADE FROM COMPOSITE MATERIAL AND METHOD FOR REINFORCING A COMPOSITE BLOCK

(75) Inventors: Francois Rouyre, Cornebarrieu (FR); Sebastien Menard, Villeneuve Tolosane (FR); Jacques Roux, Bouaye (FR)

(73) Assignee: Airbus Operations SAS, Toulouse (FR)

( * ) Notice: Subject to any disclaimer, the term of this patent is extended or adjusted under 35 U.S.C. 154(b) by 312 days.

(21) Appl. No.: 12/682,536

(22) PCT Filed: Oct. 1, 2008

(86) PCT No.: PCT/FR2008/051770
§ 371 (c)(1),
(2), (4) Date: Jun. 29, 2010

(87) PCT Pub. No.: WO2009/053573
PCT Pub. Date: Apr. 30, 2009

(65) Prior Publication Data
US 2010/0276542 A1  Nov. 4, 2010

(30) Foreign Application Priority Data
Oct. 11, 2007  (FR) ...................................... 07 58207

(51) Int. Cl.
*B32B 3/00* (2006.01)
(52) U.S. Cl.
USPC ............................ 428/71; 428/121; 244/123.1

(58) Field of Classification Search
USPC ................... 428/71, 121, 124, 126; 244/119, 244/131, 123.1
See application file for complete search history.

(56) References Cited

U.S. PATENT DOCUMENTS

| | | | |
|---|---|---|---|
| 4,470,862 A | | 9/1984 | More et al. |
| 5,112,663 A | * | 5/1992 | Morenz et al. ................. 428/71 |
| 5,679,432 A | * | 10/1997 | Holmquest et al. ............ 428/71 |
| 7,607,614 B2 | | 10/2009 | Rouyre |
| 2006/0249627 A1 | | 11/2006 | Martin Hernandez |

FOREIGN PATENT DOCUMENTS

| | | |
|---|---|---|
| FR | 2869872 A | 11/2005 |
| WO | 03072647 A | 9/2003 |

OTHER PUBLICATIONS

International Search Report and Written Opinion dated May 12, 2009.

* cited by examiner

*Primary Examiner* — Alexander Thomas
(74) *Attorney, Agent, or Firm* — Greer, Burns & Crain Ltd.

(57) ABSTRACT

A block including at least one glass ply at least partially covering an outer surface of a core made from composite material. A method for reinforcing a block made from a composite material, including a glass ply placed in a mold, such as to cover the base of the mold; the block is positioned in the mold; the edges of the glass ply are folded such that the glass ply is molded to the outer edge of the block; the mold is closed with a cover; the block housed inside the mold is cured in an oven such as to polymerize the glass ply; and the glass-ply-covered block is recovered.

15 Claims, 2 Drawing Sheets

REINFORCED BLOCK MADE FROM COMPOSITE MATERIAL AND METHOD FOR REINFORCING A COMPOSITE BLOCK

CROSS-REFERENCE TO RELATED APPLICATIONS

This application is the National Stage of International Application No. PCT/FR2008/051770 International Filing Date, 1 Oct. 2008, which designated the United States of America, and which International Application was published under PCT Article 21 (s) as WO Publication No. WO2009/053573 A2 and which claims priority from, and the benefit of, French Application No. 200758207 filed on 11 Oct. 2007, the disclosures of which are incorporated herein by reference in their entireties.

BACKGROUND OF THE INVENTION

The aspects of the disclosed embodiments relate to a block made of composite material which is reinforced in order to withstand impacts and other external stresses. The disclosed embodiments particularly relate to a block made of composite material which is intended to be placed on the upper surface of an aircraft wing in order to restore the aerofoil section in the region where said wing is fixed to the aircraft fuselage. The disclosed embodiments relate also to a method for reinforcing a block made of composite material.

It is currently known in many fields to replace some components, previously made of metallic material, with components made of composite material, notably in order to reduce the total mass of the device provided with one or more of these components. Thus, in the aeronautical field, many components, such as beams, covering panel, etc. are now made of composite material. If it enables to get good results from the point of view of the final aircraft mass, the components made of composite material can sometimes have an insufficient resistance to the charges to be withstood or to the environmental stresses.

It is notably the case when transition blocks are used in the region where an aircraft wing is fixed to said aircraft fuselage, and are intended to restore the aerofoil section of the wing in the fixation region. Such blocks made of composite material are described in the patent FR 2 869 872. The transition block made of composite material is located on the upper surface of the wing and is submitted to bad weather and to other external stresses. The transition block is made for example of a polymethacrylimid foam, that is hard and light, which facilitates its handling and installation on the upper surface of an aircraft wing.

The external surface of said block made of composite material remains however granular, even after the application of one or more protecting paint layer(s).

Moreover, it frequently happens that the block made of composite material is marked, indeed damaged, at the time of the fixation onto the aircraft wing. The block is often dented by the knee prints of the installation workers, by pots of paint used for covering the blocks, etc. The dents on the external surface of the block tend to reduce the aerodynamic performance of the aircraft, which notably increases the fuel consumption of the aircraft.

SUMMARY OF THE INVENTION

One aspect of the disclosed embodiments is to increase the resistance of a block made of composite material, such as that used as a transition block at the junction between the wing and the fuselage of an aircraft.

To this end, according to the disclosed embodiments, it is proposed to cover the block made of composite material with one or more layer(s) of glass which conform(s) to the external profile of the block. The layers of glass are advantageously polymerized on the central mass made of composite material. Thus, whatever its shape may be, the block is entirely covered with layers of glass which smooth the external surface and reinforce it against the external stresses. The disclosed embodiments aim at providing a method for reinforcing the block, wherein said block made of composite material is covered with one or more layer(s) of glass. The method according to the disclosed embodiments uses a mold able to withstand high temperatures and to be dismounted in order to free the block once the layers of glass are polymerized on the central mass made of composite material.

An aspect of the disclosed embodiments is thus a block intended to be fixed to the upper surface of an aircraft wing, wherein it comprises a core made of composite material and at least one folded layer of glass covering at least partially an external surface, or wall, of the core made of composite material.

According to embodiment examples of the block according to the disclosed embodiments, it is possible to provide all or part of the following additional characteristics:

the block comprises three folded layers of glass superposed so that three successive layers are formed around the core made of composite material; [0012] the composite material forming the block core is a polymethacrylimid foam.

The disclosed embodiments relate also a method for reinforcing a block made of composite material, wherein it comprises the following steps:

a first lower folded layer of glass is placed into a mold, in order to cover a mold bottom and in order that the edges of the lower folded layer of glass project from the lateral walls of said mold;

the block is placed into the mold, with the external side facing the outside of the mold.

the lower folded layer of glass is folded over the block, so that the folded layer of glass conforms to the external profile of the block;

the mold is closed by means a cover;

the block in the mold is fired in an oven in order to polymerize the folded layer of glass;

the block covered with the folded layer of glass is removed.

According to some embodiment examples of the method according to the disclosed embodiments, it is possible to implement all or part of the following additional steps:

a second lower folded layer of glass is placed into the mold in order to cover the first lower folded layer of glass; a third lower folded layer of glass is placed in the same way over the second lower folded layer of glass; the third lower folded layer of glass is leveled at the joint plane; the three lower folded layers of glass are successively folded over the external side of the block. In the case when the dimensions of the block and of the mold are strictly superior to the dimensions of the folded strips of glass used, a number of strips are used in an adjacent arrangement in the mold in order to form a given folded layer of glass;

the external side of the bloc is covered with a first upper folded layer of glass before placing said block into the mold. Thus, if the dimensions of the lower folded layers of glass are not sufficient for covering the entire surface of the block core, the external side of said core is covered with the upper folded layer(s) of glass, whereas the internal side and the lateral walls of said block core are covered with the lower folded layers of glass;

the block is fired in an oven in which the temperature is progressively increased at a rate of 2.degree. C./min until the temperature level of 150.degree. C.+/−20.degree. C. is reached; the temperature level is maintained for 2 hours, +1-15 min;

a mold with a bottom on which four lateral walls and a removable cover are mounted, is used; after the firing step, the cover and the four lateral walls are removed from the mold in order to remove the block covered with folded layers of glass.

BRIEF DESCRIPTION OF THE DRAWINGS

The disclosed embodiments will be better understood from the following description and from the accompanying figures. These figures are given as an indicative, but non-limitative illustration of the disclosed embodiments. In the figures.

DETAILED DESCRIPTION OF THE PREFERRED EMBODIMENTS

In the examples described below, it is referred only to transition blocks to be fixed to the upper surface of an aircraft wing in order to facilitate the passage of a joint from the means for fixing of the wing to the aircraft fuselage to the upper surface of said wing. Of course, the disclosed embodiments can also be applied to any other kind of block made of composite material, whatever its dimensions may be.

Such a transition block can have a length of several tenths of meters and a thickness which varies from one end of the block to the other. "Length" means the dimension of said block extending parallel to the longitudinal axis of the block. "Thickness" means the dimension of the block extending vertically to a plane in which the block extends.

Afterwards, "external side" means the block side facing the outside of the mold and "internal side" means the block side in contact with the mold bottom. On the other hand, in use, the external side of the block is fixed to the upper surface of the aircraft wing, and the internal side is submitted to external stresses.

Figure 1A:
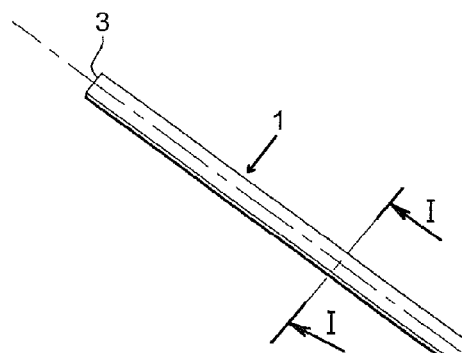
FIG. 1A is a schematic representation of a first example of a block made of composite material which can be covered with folded layers of glass according to the disclosed embodiments.

In FIG. 1A there is represented a first example of the block 1 made of composite material, which is intended to be fixed to the upper surface of an aircraft wing.

Figure 1B:
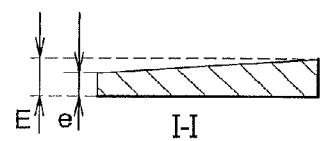
FIG. 1B is a cross sectional view of the block of FIG. 1A, taken generally along line I-I.

The block 1 comprises a beveled end 2, a second end 3 opposite the chamfered end 2 being a right angled end. Moreover, as it appears from the cross view of FIG. 1B, taken along line I-I of FIG. 1A, the thickness E, e of the block 1 decreases widthwise. "Width" means the dimension of the block 1 which extends transversely to the longitudinal axis A of the block 1.

Figure 2:
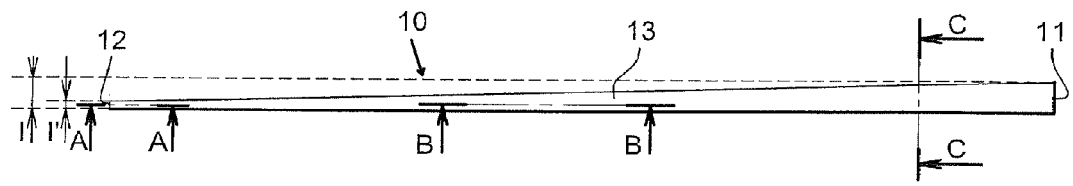
FIG. 2 is a schematic representation of a second example of a block made of composite material which can be covered with folded layers of glass according to the disclosed embodiments.

In FIG. 2 there is represented a second example of a transition block 10, said block 10 having a constant thickness, but a width I, I' which decreases from the first end 11 to a second end 12, both ends being right angled ends, in contrast with a beveled end.

The block 10 comprises a core 13 made of composite material covered with at least one folded layer of glass, which increases the resistance of the block 10 to external stresses.

In the method according to the disclosed embodiments, any block can be covered with one or more folded layer(s) of glass, whatever its dimensions, form, etc. may be.

Figure 4:
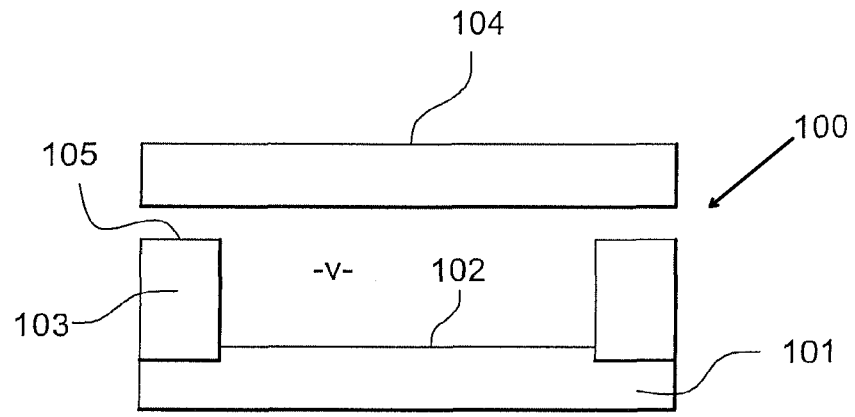
FIG. 4 is a schematic representation of a cross section of a mold used for implementing the method according to the disclosed embodiments.

To this end, according to the method of the disclosed embodiments, a mold 100 is used such as represented in FIG. 4.

The mold 100 comprises a bottom, or base 101, the internal side 102 of which is intended to receive the block 10. "Internal side" means the side in an internal volume V of the mold 100. Said mold 100 comprises otherwise four lateral walls 103 (only two lateral left and right walls are visible in FIG. 4), said lateral walls 103 being removable in order to be dismounted from the bottom 101. Moreover, the mold 100 comprises a cover 104 able to be sealed on the upper ends 105 of the lateral walls 103 in order to hermetically close the internal volume V of the mold 100.

The internal volume V of the mold 10 is able to receive the block 10.

According to the method of the disclosed embodiments, a first lower folded layer of glass 14 is initially placed against the internal wall 102 of the bottom 101 of the mold 100. The first lower folded layer of glass 14 conforms to the profile of the mold 100 and covers the bottom 102 and the lateral walls 103 as far as the ends 105. More precisely, the external edges 15 of the first lower folded layer of glass are placed side by side against the ends 105 of the lateral walls 103. The first lower folded layer of glass 14 is the layer intended to be in contact with the outside with respect to the foam core 13 which it surrounds.

Then a second lower folded layer of glass 16 is placed over the first lower folded layer of glass 14. The edges 17 of the second lower folded layer of glass 16 cover the external edges 15 of the first lower folded layer of glass 14.

Then, a third lower folded layer of glass 18 is placed over the second lower folded layer of glass 16 which it surrounds.

The external edges 19 of the third lower folded layer of glass 18 are leveled at the ends 105 of the lateral walls 103 of the mold 100. An excessive thickness at the external side 21 of the core 13 of the block 10 is thus avoided because the edges 15, 17, 19 of the folded layers of glass 14, 16, 18 are folded against said external side 21.

The core 13 made of composite material of the bock 10 is placed into the internal volume V of the mold 100 so that the internal side 20 of said core 13 made of composite material is placed against the internal wall 102 of the bottom 101 of the mold 100.

Figure 5:
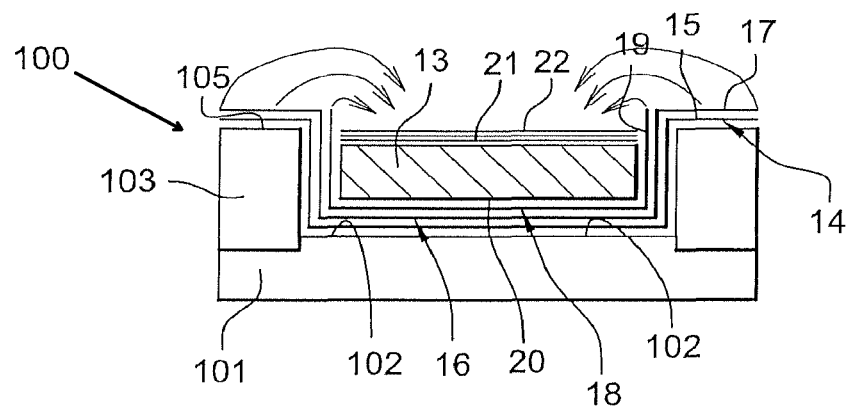
FIG. 5 is a schematic representation of a cross section of the mold according to the disclosed embodiments in which the block to be covered with folded layers of glass is placed.

In the example represented in FIG. 5, the external side 21 of the core 13 made of composite material has been first covered with three superposed upper folded layers of glass 22. The multiple folded layers of glass 22 ensure a sealing of the core 103 of the block 10 while guaranteeing that the entire surface of the core 103 is covered with at least one folded layer of glass. Indeed, if the external side 21 of the core 13 made of composite material is not covered with its own folded layers of glass and if the dimensions of the lower folded layers of glass are not sufficient, it is possible that a central portion of the core 13 of the block 10 would not be covered once the lower folded layers of glass are folded over the external side of the core 13 of the block 10.

Of course, the upper folded layers of glass 22 can be placed on the external side 21 of the core 13 made of composite material only when this core has been placed into the mold 100 and before the edges 19, 17, 15 of the lower folded layers 14, 16, 18 are folded over said external side 21, even after folding said edges 19, 17, 15 over said external side 21.

When the core 13 made of composite material is placed in the internal volume V of the mold 100, the external edges 19 of the third lower folded layer of glass 18 are folded against the external wall 21 of the core 13 and then against the external edges 17 of the second lower folded layer of glass 16 and finally against the external edges 15 of the first lower folded layer of glass 14.

The folded layers of glass 14, 16, 18, 22 are thus draped over the foam core 13 while conforming to the profile thereof.

Before folding the lower folded layers of glass 14, 16, 18 over the external wall 21 of the core 13, it is possible to cut all the angles of the folded layers of glass, or only some of them, with an angle of 45.degree. in order to avoid an excessive overlapping of the folded layers of glass 14, 16, 18 which could locally lead to a damageable excessive thickness.

The internal volume V of the mold 100 is then closed by means of the cover 104 which is fixed by any means to the lateral walls 103.

The mold 100 is then placed into an oven and heated up to 150.degree. C. at a rate of 2.degree. C./min and then the mold is left at this temperature level for two hours.

The mold 100 is then removed from the oven and is left to cool down to 60.degree. by natural convection.

The mold 100 is opened in order to extract the block 10. To that end, the lateral walls 103 are dismounted from the bottom 101 in order to easily remove the block 10 from said mold 100.

Figure 3A:
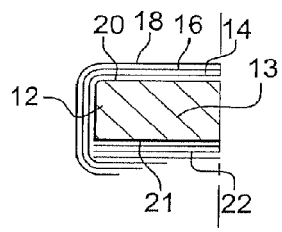
FIGS. 3A, 3B and 3C represent three sectional enlargements of the block in FIG. 2, at the front tip, a central section and a back section, respectively.
Figure 3B:
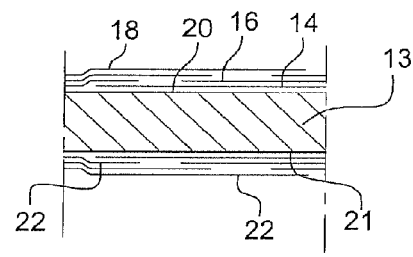
Figure 3C:
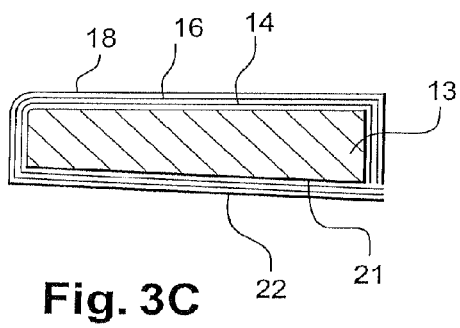

FIGS. 3A, 3B and 3C show different cross views of the block 10 covered with folded layers of glass according to the disclosed embodiments. Of course, the block 10 can be covered with more or fewer folded layers of glass, according to the thickness of said folded layers and according to the purpose of the block.

Thus, in FIG. 3A, it is represented a longitudinal section of the front end 12 of the block 10.

Three upper folded layers of glass 22 cover the external wall 21 of the core 13 made of composite material of the block 10 intended to be fixed to the upper surface of an aircraft wing. The three lower folded layers of glass 14, 16 and 18 conform to an external profile of the internal wall 20 of the core 13 made of composite material, intended to be submitted to external stresses. At this end 12, the upper folded layers are covered by the lower folded layers 14, 16, 18, which ensures a sealing of the core 13 made of composite material by means of the glass protection.

In FIG. 3B, there is represented a longitudinal section of the block 10 at some place of said block 10.

Thus, we can see the three upper folded layers 22 covering the external side 21 of the core 13 of the block 10, as well as the three lower folded layers 14, 16, 18 covering the internal side 20 of said core 13.

In the example represented in FIG. 3B, each folded layer of glass 14, 16, 18, 22 considered is formed by a number of bands of pre-impregnated fabric successively placed in the same plane. Of course, if the bands of pre-impregnated fabric used have sufficient dimensions, it is possible to use one band for each folded layer. However, in the case of a block 10 with large dimensions, the use of a number of bands of pre-impregnated fabric for forming a given folded layer of glass facilitates the installation into the mold 100: Instead of handling only one band of pre-impregnated fabric with large dimensions for placing it against the bottom 102 of the mold 100 and against the lateral walls 103 of said mold, over the entire length of said mold, a number of small bands of pre-impregnated fabric are successively placed for covering the entire internal surface of the mold 100.

In FIG. 3C, there is represented a cross section of the block 10 at some place of said block 10, showing the core 13 made of composite material surrounded with the succession of folded layers of glass 14, 16, 18 and 22 forming a tight protecting shell around said core 13.

In the particular case of transition blocks intended to be fixed to the upper surface of an aircraft wing, each folded layer of glass advantageously has a thickness of 0.2 mm+/− 0.05 mm.

The invention claimed is:

1. A block comprising a transition element intended to be fixed to the upper surface of an aircraft wing, comprising:
   a core consisting of a foam material; and
   three successive folded layers of glass comprising pre-impregnated fabric engaging and covering an entire external surface of the foam core,
   wherein each folded layer of glass comprises a thickness of 0.2 mm+/− about 0.05 mm.

2. The block according to claim 1, wherein the foam core comprises a polymethacrylimid foam.

3. The block according to claim 1, wherein the core has a largest dimension defined as a length extending between two ends, a second largest dimension defined as a width extending between two sides and a third largest dimension defined as a thickness, and wherein the width of the core is tapered from one end to the other.

4. The block according to claim 1, wherein the core has a largest dimension defined as a length extending between two ends, a second largest dimension defined as a width extending between two sides and a third largest dimension defined as a thickness, and wherein the thickness of the core is tapered from one side to the other.

5. A block comprising a transition element to be fixed to an upper surface of an aircraft wing, comprising:
   a core made of composite material having a predetermined elongated geometrical shape with an external surface area;
   the geometrical shape comprises planar surface areas defined by edges extending in an elongated, longitudinal direction, two longitudinal linear edges being parallel to one another, and
   at least one folded layer of glass comprising pre-impregnated fabric directly engaging and covering the entirety of the external surface of the core, the layer of glass comprising a thickness of 0.2 mm+/− about 0.05 mm.

6. The block according to claim 5, further comprising three layers of glass superposed so that three successive layers are formed around the entirety of the external surface of the core.

7. The block according to claim 5, wherein the core comprises a polymethacrylimid foam.

8. The block according to claim 5, wherein the at least one layer of glass is folded around the external surface of the core.

9. The block according to claim 5, wherein at least one end of the core is formed at a right angle relative to two adjacent sides.

10. The block according to claim 5, wherein two ends of the core are formed at right angles relative to two adjacent sides.

11. The block according to claim 5, wherein the core has a largest dimension defined as a length extending between two ends, a second largest dimension defined as a width extending between two sides and a third largest dimension defined as a thickness, and wherein the width of the core is tapered from one end to the other.

12. The block according to claim 5, wherein the core has a largest dimension defined as a length extending between two ends, a second largest dimension defined as a width extending between two sides and a third largest dimension defined as a thickness, and wherein the thickness of the core is tapered from one side to the other.

13. A block comprising a transition element to be fixed to an upper surface of an aircraft wing, comprising:
   a core made of composite material having a predetermined elongated geometrical shape with an external surface area;
   the geometrical shape comprises planar surface areas defined by edges extending in an elongated, longitudinal direction, two longitudinal linear edges being tapered relative to one another, and
   at least one folded layer of glass comprising pre-impregnated fabric directly engaging and covering the entirety of the external surface of the core, the layer of glass comprising a thickness of 0.2 mm+/− about 0.05 mm.

14. The block according to claim 13, wherein two longitudinal linear edges of the core are parallel relative to one another.

15. The block according to claim 13, wherein the core has a largest dimension defined as a length extending between two ends, a second largest dimension defined as a width extending between two sides and a third largest dimension defined as a thickness, and wherein the width of the core is tapered from one end to the other.

\* \* \* \* \*